United States Patent
Uesaka

(10) Patent No.: US 6,627,702 B1
(45) Date of Patent: Sep. 30, 2003

(54) RUBBER COMPOSITION AND RUBBER ROLLER

(75) Inventor: Kenichi Uesaka, Osaka (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/113,303

(22) Filed: Jul. 10, 1998

(30) Foreign Application Priority Data

Jul. 18, 1997 (JP) .............................................. 9-193666

(51) Int. Cl.[7] .................................................. C08F 8/30
(52) U.S. Cl. ........................................ 525/139; 525/141
(58) Field of Search ................................. 525/139, 141

(56) References Cited

U.S. PATENT DOCUMENTS

| | | | | |
|---|---|---|---|---|
| 4,396,756 A | * | 8/1983 | Baur et al. .................. | 528/162 |
| 4,465,807 A | * | 8/1984 | Giller et al. ................ | 525/135 |
| 4,699,832 A | * | 10/1987 | Sattelmeyer ................ | 525/139 |
| 4,791,170 A | | 12/1988 | Makino et al. | |
| 5,145,905 A | * | 9/1992 | Sattelmeyer ................ | 524/511 |

OTHER PUBLICATIONS

Whitby, G. S., Synthetic Rubber, J. Wiley & Sons (1954), p. 393.*
Japanese Patent Application Laid–Open No. 57–73035 with English abstract May 1982.
Japanese Patent Application Laid–Open No. 57–180647 with English abstract Nov. 1982.
Japanese Patent Application Laid–Open No. 63–101848 Aug. 1988.
Japanese Patent Application Laid–Open No. 2–135272 with English abstract, May 1990.
Japanese Patent Application Laid–Open No. 5–214142 with English abstract Aug. 1993.
Japanese Patent Application Laid–Open No. 9–249778 with English abstract Sep. 1997.

* cited by examiner

Primary Examiner—Bernard Lipman
(74) Attorney, Agent, or Firm—Arent Fox Kintner Plotkin & Kahn, PLLC

(57) ABSTRACT

0.3–5.0 parts by weight of phenol resin, sulfur, and vulcanizing accelerator are added to 100 parts by weight of EPDM rubber. They are kneaded, and the EPDM rubber is vulcanized and molded. Generation of blooming can be suppressed without inhibiting the vulcanizing speed and the vulcanizing start timing.

5 Claims, 2 Drawing Sheets

RUBBER COMPOSITION AND RUBBER ROLLER

BACKGROUND OF THE INVENTION

1. Field of the Invention

Generally, the present invention relates to a rubber composition containing EPDM rubber (ethylene-propylene-diene copolymer rubber) as its main component. More particularly, the present invention relates to a rubber composition which does not bloom vulcanizing accelerator in vulcanizing the vulcanizing accelerator-added EPDM rubber with sulfur so that paper-feeding rubber rollers, comprising the rubber composition, of laser beam printers, electrostatic copying machines, facsimiles and automatic deposit/payment machines (ATM) have a high friction coefficient and a high wear resistance.

2. Description of the Related Art

A rubber composition comprising the EPDM rubber (ethylene-propylene-diene copolymer rubber) contained therein as its main component has been hitherto used in large quantities for a paper-feeding roller of OA equipments such as laser beam printers, electrostatic copying machines, and facsimiles; and automatic deposit/payment machines (ATM). This is because paper-feeding rollers of the OA equipments and the automatic deposit/payment machines comprising the rubber composition are highly resistant to wear and are not deteriorated fast by ozone which is generated in the OA equipments when they are operated to form images. That is, the rubber composition is highly resistant to the ozone. In order to obtain a high coefficient of friction in the friction between the paper-feeding roller comprising the rubber composition and paper, softening agent such as process oil is added to the EPDM rubber to reduce the hardness of the paper-feeding roller. Further, in order to improve the wear resistance of the paper-feeding roller, oil-extended EPDM rubber is used to compose the rubber composition.

The EPDM rubber is used by vulcanizing it with vulcanizing agent such as sulfur or organic peroxide to increase its physical property (in particular, mechanical property). In a mixture material comprising the EPDM rubber, the softening agent such as the process oil, plasticizer, and the like, the reaction of the organic peroxide is inhibited by the softening agent. Thus, sulfur is practically used. The EPDM rubber does not have a double bond in its main chain. The double bond is present only in third components such as DCPD (dicyclopentadiene), 1,4-HD (1,4-hexadiene), and ENB (ethylidene norbornene) which are added to the EPDM rubber as a diene component. Further, the technique of polymerizing the third component with the polymer has a limitation. Thus, even though the EPDM rubber having the greatest iodine number (iodine number: 35) is vulcanized with sulfur, the vulcanizing speed thereof is lower than that of a diene polymer such as NR (natural rubber) or BR (butadiene rubber). In order to increase the vulcanizing speed of the EPDM rubber, vulcanizing accelerator has been hitherto added to the EPDM rubber in addition to the sulfur (vulcanizing agent) by selecting an appropriate kind of the vulcanizing accelerator and optimizing the addition amount thereof.

However, because the vulcanizing accelerator has a high polarity, it is difficult for it to be present in the EPDM rubber having a low degree of polarity. Thus, the vulcanizing accelerator is not dispersed uniformly in the EPDM rubber which has not been vulcanized. Consequently, in a product obtained after vulcanizing the EPDM rubber, the vulcanizing accelerator and reaction product thereof bloom. The blooming of the vulcanizing accelerator and reaction product thereof causes the reduction in the friction coefficient of the paper-feeding roller of the OA equipments and the automatic deposit/payment machine (ATM) formed by molding the product (EPDM rubber), into a roller shape, containing the vulcanizing accelerator and the reaction product thereof which bloom.

A method of suppressing the blooming by adding filler such as silica having a preferable adsorbing property to the EPDM rubber is known. The method is capable of suppressing the generation of the blooming of the vulcanizing accelerator and the reaction product thereof, but causes the hardness of the rubber composition to be increasingly high as the addition amount of the filler increases. Therefore, the paper-feeding roller comprising the EPDM rubber molded into a roller shape and containing much amount of the filler cannot be allowed to have a high friction coefficient for paper.

A method of suppressing the blooming of the vulcanizing accelerator by adding a small amount of polyalkylene glycol or polyoxyethylene alkylene ether to the EPDM rubber is known. But these methods are incapable of providing satisfactory blooming-suppressing effect and in addition, cause the polyalkylene glycol or the polyoxyethylene alkylene ether to be separated out from the vulcanized rubber composition.

SUMMARY OF THE INVENTION

The present invention has been made in view of the above-described situation. Therefore, it is an object of the present invention to provide a rubber composition containing EPDM rubber, as its main component, which can be vulcanized efficiently without generating blooming of vulcanizing accelerator added thereto so that a rubber roller comprising the rubber composition has a high friction coefficient and a high wear resistance.

In order to solve the above-described problem, there is provided a rubber composition comprising EPDM rubber contained therein as a main component thereof. Vulcanizing accelerator and 0.3–5.0 parts by weight of phenol resin are added to 100 parts by weight of the EPDM rubber. A mixture thereof is vulcanized with sulfur. The phenol resin is obtained through a two-step reaction, namely, addition reaction and condensation reaction of phenols and aldehydes.

Furthermore, there is provided a rubber composition comprising EPDM rubber contained therein as a main component thereof. Vulcanizing accelerator and 0.3–10.0 parts by weight of halogenated phenol resin are added to 100 parts by weight of the EPDM rubber. A mixture thereof is vulcanized with sulfur. The halogenated phenol resin consists of aldehyde units of the phenol resin and at least one halogen atom bonded to each of the aldehyde units. The halogenated phenol resin is indicated by a structural formula (Chemical formula 1) shown below:

[Chemical Formula 1]

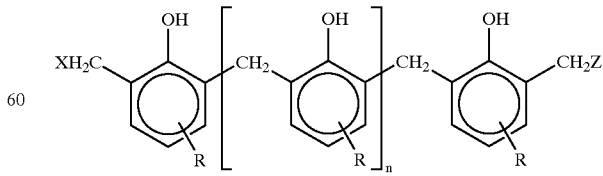

where X is halogen element, Z is halogen element or —OH and R is hydrogen element or alkyl group having 1–10 carbons.

The above-described construction prevents blooming of the vulcanizing accelerator without making the vulcanization speed of the EPDM rubber slow and deteriorating the physical property of the rubber composition. Consequently, when the rubber composition is molded into the shape of a roller to use the roller as a paper-feeding roller of OA equipments and automatic deposit/payment machines (ATM), the paper-feeding roller can be allowed to have a much higher friction coefficient in the friction between it and paper than that composed of the conventional rubber composition.

The reason why the above-described construction prevents the blooming of the vulcanizing accelerator is because the phenol resin (halogenated phenol resin) having a higher polarity than the EPDM rubber is compatible with the EPDM rubber, thus increasing the polarity of the entire rubber composition. As a result, the compatibility of the vulcanizing accelerator having a high polarity with the rubber composition can be improved. Because the phenol resin is a polymer of phenols and aldehydes copolymerized uniformly with each other, thus having uniformity in its molecular weight, physical property, and reactivity, the rubber composition obtained by vulcanizing the EPDM rubber has a uniform physical property in comparison with a EPDM rubber comprising the conventional ingredients. Thus, there is no variation in its performance and wear resistance of a paper-feeding roller comprising the rubber composition.

The reason why 0.3–5.0 parts by weight of the phenol resin is added to 100 parts by weight of the EPDM rubber is because if the addition amount of the phenol resin is less than 0.3 parts by weight, the rubber composition is not allowed to have a sufficient polarity-improving action, whereas if the addition amount of the phenol resin is more than 5.0 parts by weight, the phenol resin is separated out from the rubber composition. Thus, when the rubber composition containing more than 5.0 parts by weight of the phenol resin is molded into the shape of a roller to compose a feeding roller which is used to feed paper or the like, the feeding roller has a low friction coefficient in the friction between it and the paper.

It is for the same reason as that described above that 0.3–10.0 parts by weight of the halogenated phenol resin is added to 100 parts by weight of the EPDM rubber. The reason why the maximum addition amount of the halogenated phenol resin is increased to 10 parts by weight is as follows: Although the phenol resin has a low degree of reactivity with the EPDM rubber, the phenol resin has a higher degree of reactivity therewith when it is halogenated. Consequently, the halogenated phenol resin has a high bonding strength to the EPDM rubber. Thus, the halogenated phenol resin is prevented from being separated out from the rubber composition to a high degree.

The known EPDM rubber which can be used for the rubber composition of the present invention. That is, oil-extended EPDM rubber or non-oil-extended EPDM rubber or a mixture thereof can be used. The diene component of the EPDM rubber is not limited to a specific one, but ethylidene norbornene (ENB), dicyclopentadiene (DCPD), and the like can be used.

Rubbers other than the EPDM rubber can be used to compose the rubber composition. The following rubbers are exemplified: Natural rubber(NR), butadiene rubber(BR), ethylene-propylene rubber(EPM), styrene-butadiene rubber (SBR), butyl rubber(IIR), halogenated IIR, chloroprene rubber(CR), chlorosulfonated polyethylene rubber(CSM), copolymer rubber of epichlorohydrin and ethylene oxide (CIC), homopolymer rubber of epichlorohydrin(CHR), hydrogenated nitrile rubber(NBR), chlorinated polyethylene, urethane rubber, and mixed rubber of silicone and ethylene propylene.

Phenol resins synthesized by the reaction (addition and condensation reactions) of phenols such as phenol, alkylphenol, cresol, xylenol, resorcinol with aldehydes such as formaldehyde acetaldehyde furfural can be used. Modified resins thereof can be also used.

As the phenols, alkylphenol consisting of a benzene ring to which at least one alkyl group is bonded can be preferably used. This is because the alkylphenol is compatible with the EPDM rubber. Thus, the phenol resin consisting of the alkylphenol is scarcely separated out from the rubber composition. Formaldehyde can be preferably used as the aldehydes. This is because the phenol resin consisting of the formaldehyde is reactive and inexpensive, which allows the cost of the rubber composition (product) to be low. Thus, alkylphenol-formaldehyde resin can be preferably used as the phenol resin. The alkyl group of the alkylphenol has normally 1–10 carbons. As the alkyl group, methyl group, ethyl group, propyl group, and butyl group are exemplified.

The halogenated phenol resin is formed as follows: After halogen atom-uncontained phenol resin is synthesized by the reaction (addition and condensation reactions) of phenol and aldehyde, aldehyde unit of the phenol resin and halogenated hydrogen (HX) are allowed to react with each other to replace hydroxyl group of the aldehyde unit with the halogen atom. The halogenated phenol resin formed by the following method can be also used: After the halogen atom-uncontained phenol resin and donor materials for giving a halogen atom such as a metal halide are added to the EPDM rubber, the hydroxyl group of the aldehyde unit of the phenol resin is replaced with the halogen atom during vulcanization.

The halogen atom of the halogenated phenol resin may consist of bromine, fluorine, and iodine in addition to chlorine. As the donor materials for giving a halogen atom, a metal halide such as tin chloride (stannic chloride), iron chloride (ferric chloride), copper chloride (cupric chloride); and halogenated resin such as chlorinated polyethylene can be used.

The degree (n) of polymerization (number of connections of repeating unit) of the phenol resin and that of the halogenated phenol resin are normally 3–7 and preferably 4–5. This is because if the degree of polymerization thereof is too small, the degree of effect of their adsorbing remaining vulcanization accelerator and product of reaction is low, whereas if the degree of polymerization thereof is too large, the vulcanization of the EPDM rubber is inhibited thereby.

In the case of the non-oil-extended rubber, the specified part by weight of the phenol resin or the halogenated phenol resin which is added to the EPDM rubber is a value for 100 parts by weight thereof. In the case of the oil-extended rubber, the specified part by weight of the phenol resin or the halogenated phenol resin which is added thereto is a value for 100 parts by weight of the EPDM rubber determined by subtracting the amount of an oil component from that of the oil-extended rubber. In the case of a mixture of the oil-extended rubber and the non-oil-extended rubber, the specified part by weight of the phenol resin or the halogenated phenol resin which is added thereto is a value for 100 parts by weight which is the sum of the amount of the non-oil-extended rubber and that of the EPDM rubber determined by subtracting the amount of the oil component from that of the oil-extended rubber.

Sulfur serving as the vulcanizing agent is added to the EPDM rubber is normally at 0.3–4 parts by weight and preferably at 0.5–3 parts by weight per 100 parts by weight of the EPDM rubber. As the vulcanizing accelerator which is added to the EPDM rubber, together with the sulfur, inorganic accelerator such as slaked lime, magnesia(MgO), and litharge(PbO); and organic accelerators listed below can be used.

The organic accelerators include thiazole vulcanizing accelerator such as 2-mercaptobenzothiazole, N-cyclohexyl-2-benzothiazolesulfene: sulfeneamide vulcanizing accelerators such as oxidative condensates of the 2-mercaptobenzothiazole and aliphatic primary amine such as n-butyl-amine, tert-butyl-amine, propylamine, and the like; oxidative condensates of the 2-mercaptobenzothiazole and aliphatic secondary amine such as dicyclohexylamine, pyrrolidine, piperidine, and the like; oxidative condensates of alicyclic primary amine and the 2-mercaptobenzothiazole; oxidative condensates of morpholine compounds and the 2-mercaptobenzothiazole: thiuram vulcanizing accelerators such as tetramethylthiuram monosulfide(TMTM), tetramethylthiuram disulfide (TMTD), tetraethylthiuram dimonosulfide(TETD), tetrabutylthiuram dimonosulfide(TBTD), dipentamethylenethiuram tetrasulfide(DPTT), and the like: dithiocarbamate vulcanizing accelerators such as zinc dimethyldithiocarbamate(ZnMDC), zinc diethyldithiocarbamate (ZnEDC), zinc di-n-butylcarbamate(ZnBDC), and the like. In particular, it is favorable to use at least one of the thiazole vulcanizing accelerator and the sulfeneamide vulcanizing accelerator in combination with at least one of the thiuram vulcanizing accelerator and the dithiocarbamate vulcanizing accelerator. It is more favorable to use all of the thiazole vulcanizing accelerator, the sulfeneamide vulcanizing accelerator, the thiuram vulcanizing accelerator, and the dithiocarbamate vulcanizing accelerator. This is because the use of at least one of the thiazole vulcanizing accelerator and the sulfonamide vulcanizing accelerator allows vulcanizing speed to be fast, and the use of at least one the thiuram vulcanizing accelerator and the dithiocarbamate vulcanizing accelerator allows the start timing of vulcanization to be prompt, thus allowing the vulcanization to be progressed efficiently.

The vulcanizing accelerator is added to 100 parts by weight of the EPDM rubber at 1–6 parts by weight thereof and preferably at 3–5 parts by weight thereof.

In order to allow the rubber composition to have a low hardness, oil or plasticizer may be added to the EPDM rubber. As the oil, mineral oil such as paraffinic oil, naphthenic oil, aromatic oil; known synthetic oil consisting of hydrocarbon oligomer; and process oil can be used. As the synthetic oil, oligomer of α-olefin, oligomer of butene, oligomer of ethylene and α-olefin is favorable by preference. As the plasticizer, dioctyl phthalate(DOP), dibutyl phthalate(DBP), dioctyl sebacate(DOS), dioctyl adipate (DOA) can be used.

5–40 parts by weight of the oil is added to 100 parts by weight of the EPDM rubber. 5–20 parts by weight the plasticizer is added to 100 parts by weight of the EPDM rubber.

In order to improve the strength of the rubber composition, filler may be added to the EPDM rubber. As the filler, powder such as silica, carbon black, clay, talc, calcium carbonate, dibasic phosphite(DLP), basic magnesium carbonate, and alumina are exemplified. It is preferable to use the filler at less than 10 wt % per the entire rubber composition which is to be formed because if the rubber composition contains an excess amount of the filler, its hardness becomes too high. In addition to the above-described ingredients, antioxidant or wax may be added to the rubber composition which is to be formed, if necessary. The antioxidant includes imidazoles such as 2-mercaptobenzoimidazole; amines such as phenyl-α-naphthylamine, N,N'-di-β-naphthyl-p-phenylenediamine, and N-phenyl-N'-isopropyl-p-phenylenediamine; and phenols such as di-tert-butyl-p-cresol and styrenated phenol.

When the rubber composition contains a small amount of the EPDM rubber as its main component, the rubber composition has a low degree of ozone resistance. Thus, when a paper-feeding roller of a copying machine or a laser beam printer is composed of the rubber composition, the paper-feeding roller is liable to deteriorate in a short period of time as a result of repeated use. In consideration of this problem, the EPDM rubber is added to 100 parts by weight of the entire polymer component of the rubber composition at favorably 50 parts by weight or more, more favorably 80 parts by weight or more, and most favorably, 95 parts by weight or more.

The rubber composition of the present invention is produced by kneading the EPDM rubber, the sulfur, the vulcanizing accelerator, the phenol resin, and the like and then vulcanizing the kneaded material. These substances are kneaded by known methods and apparatuses. For example, known rubber-kneading apparatuses such as an open roll or a Banbury mixer can be used to knead the substances at 60–120° C. for 5–30 minutes.

The kneaded material can be also vulcanized by known methods. That is, the kneaded material is vulcanized at 150° C.–180° C. for 5–30 minutes by an electric press machine or a vulcanizing can. Electron rays may be used to vulcanize the kneaded material.

The rubber composition may be molded to form it into a desired shape before or when it is vulcanized. For example, in shaping it into a roller, the kneaded material is compression-molded by a roller-shaped die and then, the die is heated to vulcanize it. More specifically, as shown in FIG. 1, after the kneaded material is molded by the roller-shaped die, a shaft S is inserted into a roller-shaped molded material R, and then, the shaft S is rotatably supported by a supporting member C. While the roller-shaped molded material R is being rotated at a predetermined speed on the shaft S, it is irradiated with electron rays having a predetermined absorbed doze emitted by an electron ray-irradiating device to pre-vulcanize the surface of the roller-shaped molded material R. Then, the roller-shaped molded material R is put into a vulcanizing can to vulcanize the entire molded material R. Further, it is possible to vulcanize the kneaded material while it is being molded into a desired shape of, for example, a sheet, roller of the like by injection molding, transfer molding or extrusion molding.

According to the present invention, it is essential that the surface of the rubber roller is formed of the above-described rubber composition. The method of manufacturing the rubber roller is not limited to a specific one. The rubber composition of the rubber roller is preferably solid so that it has a high friction coefficient.

When the rubber roller of the present invention can be used as a paper-feeding roller such as a paper supply roller, a paper-carring roller, a paper discharge roller positioned at a rear part of a fixing device in the OA equipments . A fine effect can be provided by the rubber roller when it is used as the paper-feeding roller which is greatly affected by the fluctuation of the friction coefficient thereof in the paper-feeding performance thereof and required to keep the paper-feeding performance thereof for a long time.

FIG. 2 shows a state in which the rubber roller of the present invention is applied to a paper supply roller of an electrostatic copying machine. A shaft 2 is inserted into the center of a rubber roller 1 confronting a pad 3. When the shaft 2 is rotated in a direction shown by an arrow, the rubber roller 1 rotates in the same direction, thus rolling a sheet of paper 4 positioned near the rubber roller 1 into the gap between it and the pad 3 and supplying the paper 4 to the inside of the copying machine.

FIG. 3 shows a state in which the rubber roller of the present invention is applied to a paper supply roller, (upper rubber roller 10b and lower rubber roller 10a) of the electrostatic copying machine, supplying sheets of paper to the inside thereof by separating an upper sheet of paper from the adjacent lower sheet of paper. A shaft 2 is inserted into the center of the lower rubber roller 10a. A torque 11 is always applied to the lower rubber roller 10a and the shaft 2 in the direction opposite to a paper-feeding direction. The shaft 2 is inserted into the center of the upper rubber roller 10b. The upper rubber roller 10b is rotated in a direction shown by an arrow A owing to the rotation of the shaft 2. When the upper rubber roller 10b rotates in the direction shown by the arrow A, a sheet of paper 13 positioned uppermost on a sheaf 12 of paper is separated from a sheet of paper adjacent thereto because the torque 11 is applied to the lower rubber roller 10a. Then, the paper 13 passes the gap between the upper rubber roller 10b and the lower rubber roller 10a and is supplied to the inside of the copying machine.

As the shaft 2, a circular rod made of metal or resin is used. The shaft 2 is inserted into the through-hole of the rubber roller 10a (10b). An adhesive layer may be formed between the shaft 2 and the rubber roller 10a (10b). the thickness of the rubber roller 10a (10b) is preferably 3 mm–20 mm because if the thickness thereof is less than 3 mm, it is not sufficiently elastic and thus paper supply performance deteriorates in a short period of time.

DESCRIPTION OF THE PREFERRED EMBODIMENTS

Figure 1:
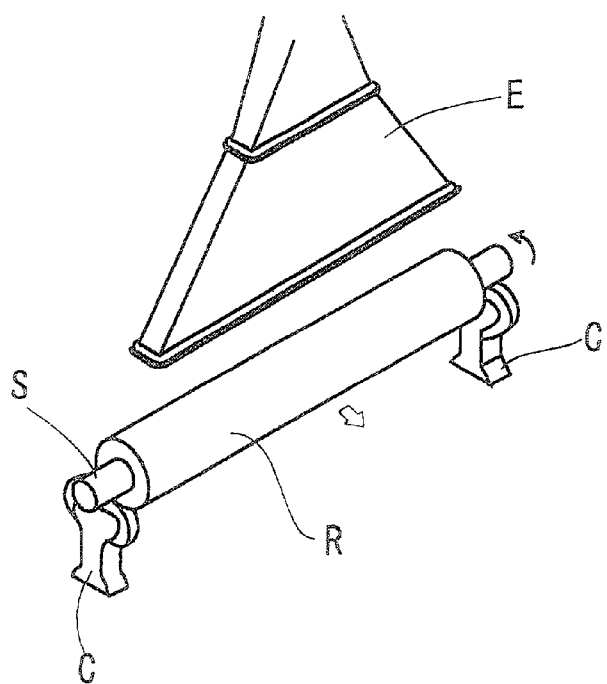
FIG. 1 is a perspective view showing an example of a process for molding a rubber composition of the present invention into the shape of a roller and vulcanizing a rubber component thereof.
Figure 2:
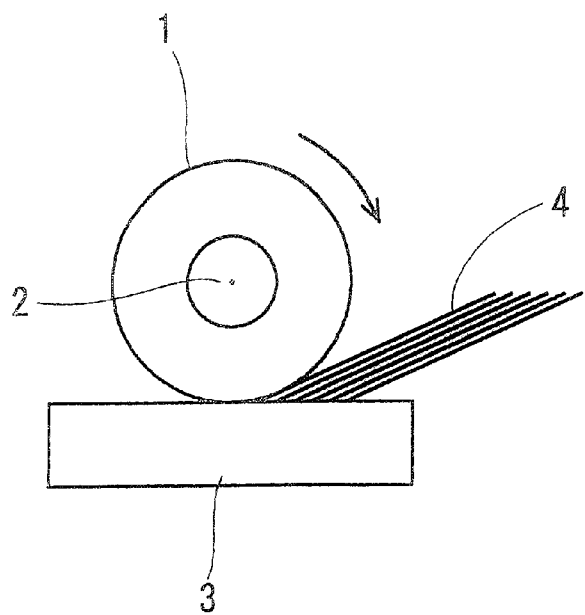
FIG. 2 is a view showing a state in which a rubber roller of the present invention is applied to a paper supply roller of an electrostatic copying machine.
Figure 3:
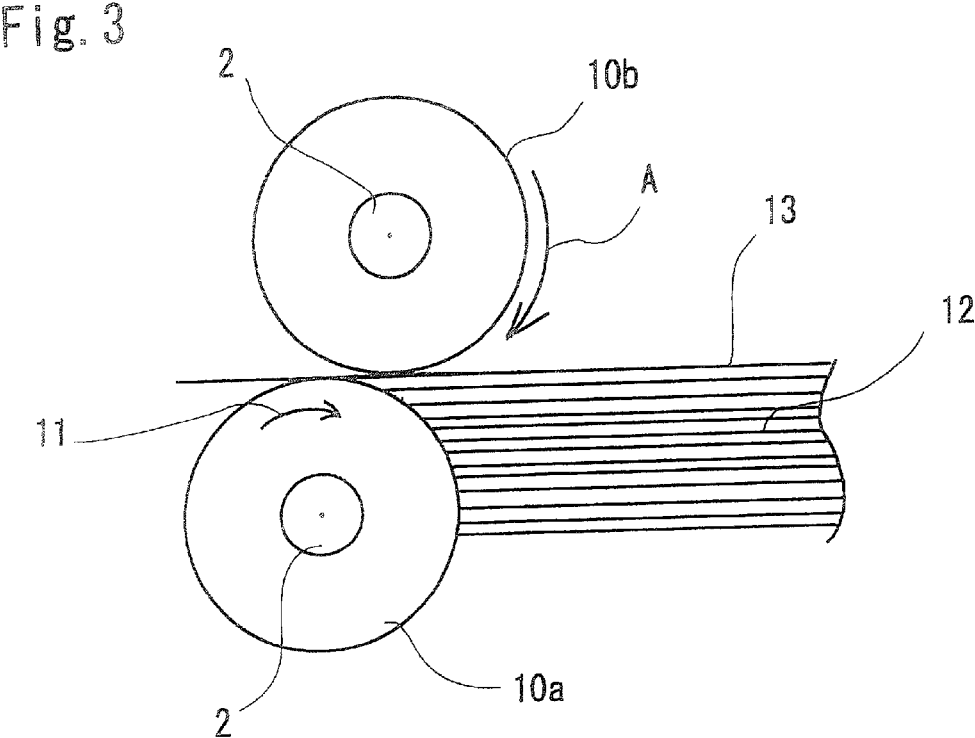
FIG. 3 is a view showing a state in which the rubber roller of the present invention is applied to the paper supply roller, of the electrostatic copying machine, which supplies sheets of paper to the inside thereof by separating the sheets of paper from each other.

The examples of the present invention and comparative examples will be described below.

FIRST EXAMPLE

Raw materials shown below were kneaded by a kneader (55L kneader) at 100° C. for 15 minutes.
  200 parts by weight of oil-extended EPDM rubber (ethylidene norbornene (ENB)) [50 parts by weight of EPDM rubber and 50 parts by weight of process oil] (manufactured by Sumitomo Kagaku Co., Ltd, ESPRENE 670F)

2.0 parts by weight of phenol resin [alkylphenol-formaldehyde resin, number of carbons of alkyl group of alkylphenol: 5–10, degree of polymerization: 4–5] (manufactured by Taoka Kagaku Co., Ltd., Tackirol 201)

10 parts by weight of silica (manufactured by Nihon Silica Co., Ltd., Nipsil. VN3)

1 part by weight of stearic acid (manufactured by Nihon Yushi Co., Ltd.)

5 parts by weight of zinc oxide (manufactured by Mitsui Kinzoku Kagaku Kogyo Co., Ltd.)

2 parts by weight of sulfur (manufactured by Tsurumi Kagaku Kogyo Co., Ltd.)

1 part by weight of vulcanizing accelerator ⑦(manufactured by Ouchi Shinko Kagaku Co., Ltd., N-cyclohexyl-2-benzothiazole sulfeneamide, Nocceler CZ)

0.3 parts by weight of vulcanizing accelerator ②(manufactured by Ouchi Shinko Kagaku Co., Ltd., tetra-ethylthiuram disulfide, Nocceler TET)

The material resulting from the kneading was vulcanized by an electric press machine for 30 minutes at 160° C. and 20 kg/cm$^2$ to prepare a rubber roller having an outer diameter of 20 mm, an inner diameter of 9 mm, and a width of 10 mm.

As a blooming-examining sample, the material resulting from the kneading was vulcanized by an electric press machine for 20 minutes at 160° C. and 100 kg/cm$^2$ to prepare a rubber plate 100 mm long, 100 mm broad, and 2 mm thick.

SECOND–SIXTH EXAMPLES 200 parts by weight of the oil-extended EPDM rubber in the formulation of the first example was replaced with 100 parts by weight of non-oil-extended EPDM rubber (manufactured by Sumitomo Kagaku Co., Ltd, ESPRENE 505A); 30 parts by weight of process oil was added to the non-oil-extended EPDM rubber; and the addition amount of the phenol resin was different from one another in each of the second through sixth examples, as shown in table 1. Using each material thus prepared, kneading, vulcanization, and molding were carried out in a manner similar to that of the first example to form a rubber roller and a rubber plate of each example.

TABLE 1

|  | Phenol Resin (Part by weight) |
| --- | --- |
| Example 2 | 0.3 |
| Example 3 | 1.0 |
| Example 4 | 2.0 |
| Example 5 | 3.0 |
| Example 6 | 5.0 |

FIRST AND SECOND COMPARATIVE EXAMPLES

Except that the phenol resin was added to the EPDM rubber, a material of the first comparative example having a formulation similar to the second through sixth examples was kneaded, vulcanized, and molded in a manner similar thereto to obtain a rubber roller and a rubber plate of the first comparative example. Except that the addition amount of the phenol resin was changed to 7.0 parts by weight, a material of the second comparative example having a formulation similar to that of the second through sixth examples was kneaded, vulcanized, and molded in a manner similar thereto to obtain a rubber roller and a rubber plate of the second comparative example.

SEVENTH–13TH EXAMPLES

The addition amount of the phenol resin in the formulation of the first example was changed to 3.0 parts by weight; 30 parts by weight of process oil (manufactured by Idemitsu Kosan Co., Ltd., Diana Process Oil PW-90) was added to the EPDM rubber, and 0.6 parts by weight of stannic chloride (manufactured by Yamanaka Kagaku Co., Ltd.) was added to the phenol resin. A material was kneaded, vulcanized, and molded in a manner similar to that of the first example to obtain a rubber roller and a rubber plate of the seventh example.

Except the phenol resin of the second example, other substances were the same as those of the second example, and the phenol resin and stannic chloride (manufactured by Yamanaka Kagaku Co., Ltd.) were added to the phenol resin by differentiating the addition amount of the phenol resin and that of the stannic chloride from one another in eighth to 13th examples. A material of each of the eighth to 13th examples was kneaded, vulcanized, and molded in a manner similar to that of the first example to obtain a rubber roller and a rubber plate of each of the eighth to 13th examples. The addition amount (addition amount of oil-extended EPDM rubber per 100 parts by weight of the EPDM polymer) of the phenol resin and that of the stannic chloride (manufactured by Yamanaka Kagaku Co., Ltd.) of the seventh example are also shown in table 2.

TABLE 2

|  | Phenol Resin (A) (Part by weight) | Metal Halide (B) (Part by weight) | B/A (%) |
| --- | --- | --- | --- |
| Example 7 | 3.0 | 0.6 | 20 |
| Example 8 | 0.3 | 0.1 | 33 |
| Example 9 | 1.0 | 0.2 | 20 |
| Example 10 | 3.0 | 0.6 | 20 |
| Example 11 | 6.0 | 0.8 | 13 |
| Example 12 | 0.0 | 1.0 | 10 |
| Example 13 | 10.0 | 1.5 | 15 |

THIRD AND FOURTH COMPARATIVE EXAMPLES

Except that the addition amount of the phenol resin was changed to 12.0 parts by weight, a material having a formulation similar to that of the 12th example was kneaded, vulcanized, and molded in a manner similar to that of the 12th example to obtain a rubber roller and a rubber plate of the third comparative example.

Except that the addition amount of the phenol resin was changed to 12.0 parts by weight, a material having a formulation similar to that of the 13th example was kneaded, vulcanized, and molded in a manner similar to that of the 13th example to obtain a rubber roller and a rubber plate of the fourth comparative example.

The hardness [hardness: JIS A tensile strength ($kg/cm^2$) of the rubber roller of each of the examples and the comparative examples was measured, and the following test were conducted on the respective rubber rollers and rubber plates.

Wear Resistance Test

Each rubber roller was installed on a copying machine to conduct a paper-feeding test. More specifically, 100,000 sheets of paper (PPC paper manufactured by Fuji Xerox Office Supply Co., Ltd.) of size A4 were fed by each rubber roller for five hours at 23° C. and at a humidity of 55%. The wear amount (mg) of each rubber roller was determined by measuring the weight thereof before and after conducting the paper-feeding test.

Test for Measuring Friction Coefficient

The friction coefficient (initial friction coefficient) of each rubber roller was measured before conducting the paper-feeding test and after conducting the paper-feeding test.

Figure 4:
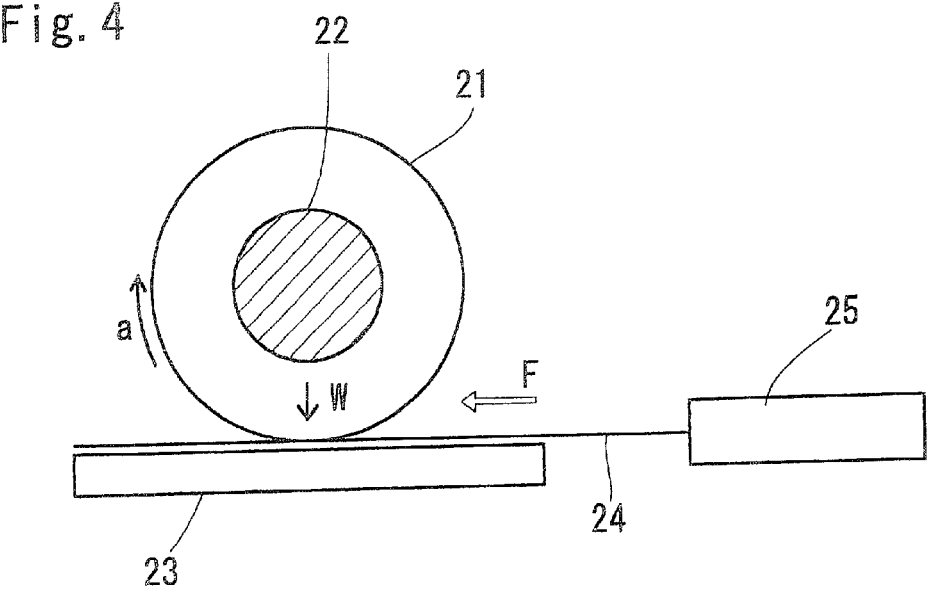
FIG. 4 is a schematic side view showing a method of measuring the friction coefficient of the rubber roller.

That is, as shown in FIG. 4, a load (W) of 250 g (black arrow of FIG. 4) was applied to a rotation shaft 22 of a rubber roller 21 by sandwiching a PPC paper 24 of size A4 connected with a load cell 25 between the rubber roller 21 and a plate 23. The rubber roller 21 was rotated at a speed of 300 mm/second in a direction shown by an arrow (a) of a solid line in the condition of 22° C. and a humidity of 55%. A force F (g) generated in a direction shown by a white arrow was measured by the load cell 25 before and after a predetermined number of papers was applied to the rubber roller 21. Using an equation shown below, friction coefficient ν of the rubber roller 21 was determined from the measured value F (g) and the load (W) (250 g).

$$\nu = F(g)/W(g) \qquad \text{[Equation 1]}$$

In order to examine the friction coefficient of each rubber roller, the paper-feeding test was not conducted after measuring the initial friction coefficient. Each rubber roller was left to be exposed to the atmospheric air at 23° C. and at a humidity of 55% to measure the friction coefficient thereof after exposing it to the atmospheric air for one month, three months, and six months in the same method as the above-described one.

Evaluation of Generation of Blooming

Each rubber roller was left to expose it to the atmospheric air for one month, three months, and six months at 23° C. and at a humidity of 55% to visually inspect the surface thereof as to whether deposit was present thereon after the elapse of one month, three months, and six months. In table 3,4 ⊚ indicates that no deposit was found on the surface of the rubber roller and thus the rubber roller was "fine"; ○ indicates that a very small amount of deposit was found on the surface thereof and thus the rubber roller was "good"; Δ indicates that the amount of deposit was rather much but can be ignored; and X indicates that a very large amount of deposit was recognized on the surface thereof and thus the rubber roller was "bad". The test result is shown in table 3,4.

TABLE 3

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Hardness JISA | 36 | 38 | 38 | 37 | 36 | 33 | 37 | 38 | 38 | 37 |
| Tensile Strength (kg/cm$^2$) | 49 | 52 | 51 | 50 | 48 | 35 | 49 | 52 | 50 | 50 |
| Initial Friction Coefficient | 2.38 | 2.31 | 2.36 | 2.39 | 2.40 | 2.25 | 2.40 | 2.29 | 2.39 | 2.42 |
| Final Friction Coefficient | 1.87 | 1.82 | 1.84 | 1.85 | 1.84 | 1.79 | 1.83 | 1.85 | 1.84 | 1.82 |
| Friction Coefficient (After leaving one month) | 2.41 | 1.89 | 2.22 | 2.42 | 2.42 | 2.01 | 2.35 | 2.20 | 2.31 | 2.40 |
| Friction Coefficient (After leaving three months) | 2.36 | 1.65 | 2.06 | 2.39 | 2.36 | 1.92 | 2.33 | 2.05 | 2.27 | 2.39 |
| Friction Coefficient (After leaving six months) | 2.22 | 1.59 | 1.98 | 2.27 | 2.24 | 1.79 | 2.31 | 2.02 | 2.21 | 2.39 |
| Visual Inspection of blooming (After one month) | ⊚ | ○ | ⊚ | ⊚ | ⊚ | ○ | ⊚ | ⊚ | ⊚ | ⊚ |
| Visual Inspection of blooming (After three months) | ⊚ | Δ | ○ | ⊚ | ⊚ | ⊚ | ⊚ | ○ | ⊚ | ⊚ |
| Visual Inspection of blooming (After six months) | ⊚ | Δ | ○ | ○ | ○ | Δ | ⊚ | ○ | ○ | ⊚ |
| Wear Amount (mg) | 12 | 12 | 12 | 12 | 12 | 18 | 12 | 12 | 12 | 12 |

TABLE 4

|  | Example 11 | Example 12 | Example 13 | Example 14 | Example 15 | Example 16 | Comparative Example 1 | Comparative Example 2 | Comparative Example 3 | Comparative Example 4 |
|---|---|---|---|---|---|---|---|---|---|---|
| Hardness JISA | 36 | 33 | 33 | 38 | 38 | 36 | 38 | 29 | 29 | 29 |
| Tensile Strength (kg/cm$^2$) | 48 | 35 | 32 | 50 | 49 | 48 | 52 | 21 | 24 | 23 |
| Initial Friction Coefficient | 2.34 | 2.20 | 2.17 | 2.38 | 2.44 | 2.38 | 2.26 | 1.98 | 2.02 | 1.99 |
| Final Friction Coefficient | 1.82 | 1.98 | 1.97 | 1.89 | 1.90 | 1.86 | 1.79 | 1.52 | 1.82 | 1.79 |
| Friction Coefficient (After leaving one month) | 2.18 | 1.99 | 2.04 | 2.35 | 2.41 | 2.28 | 1.64 | 1.66 | 1.68 | 1.70 |
| Friction Coefficient (After leaving three months) | 2.12 | 1.89 | 1.92 | 2.31 | 2.40 | 2.27 | 1.34 | 1.48 | 1.44 | 1.52 |
| Friction Coefficient (After leaving six months) | 2.14 | 1.85 | 1.85 | 2.24 | 2.40 | 2.24 | 1.14 | 1.22 | 1.24 | 1.29 |
| Visual Inspection of blooming (After one month) | ⊚ | ○ | ○ | ⊚ | ⊚ | ⊚ | Δ | Δ | Δ | Δ |
| Visual Inspection of blooming (After three months) | ○ | ○ | ○ | ⊚ | ⊚ | ⊚ | x | x | x | x |
| Visual Inspection of blooming (After six months) | ○ | ○ | ○ | ○ | ⊚ | ○ | x | x | x | x |
| Wear Amount (mg) | 12 | 18 | 18 | 12 | 12 | 12 | 12 | 25 | 30 | 29 |

As indicated in Table 3 and 4, the initial friction coefficient of the rubber roller of each of the first through 16th examples was 2.17–2.44 and thus the rubber rollers were good; the initial friction coefficient of the rubber roller of the first comparative example was 2.26 and thus the rubber roller was good; and the initial friction coefficient of the rubber roller of each of the second through fourth comparative examples was 1.98–2.02 which was much lower than those of the rubber rollers of the examples.

The friction coefficient of the rubber roller of each of the first through 16th examples measured after conducting the paper-feeding test was 1.79–1.98; that of the rubber roller of the first comparative example was 1.79; and that of the rubber roller of the second comparative example was 1.52 which was much lower than those of the rubber rollers of the examples and hence deteriorated rapidly, subjected to the friction between it and paper.

The friction coefficient of the rubber roller of each of the first through 16th examples measured after they were left to expose them to the atmospheric air for six months was in the range of 2.40–1.59, whereas that of the rubber roller of each of the first through fourth comparative examples was in the range of 1.29–1.14 which was much lower than those of the rubber rollers of the examples. In particular, the initial friction coefficient of the rubber roller of the first comparative example was 2.26 and thus high, but the friction coefficient of the rubber roller thereof measured after the elapse of six months' exposure to the atmospheric air was 1.14. This indicates that the friction coefficient of the rubber roller of the first comparative example deteriorated much with age.

The friction coefficients of the rubber rollers measured after the elapse of six months' exposure to the atmospheric air were in the range of 1.98–2.40 and thus very high in the first, third through fifth examples (1.0–3.0 parts by weight of phenol resin was added to 100 parts by weight of EPDM rubber), the seventh–through 11th examples (0.3–6.0 parts by weight of phenol resin was added to 100 parts by weight of EPDM rubber, and 13%–33% of stannic chloride was added to the phenol resin), and the 14th–16th examples (1.0–6.0 parts by weight of halogenated phenol resin was added to 100 parts by weight of EPDM rubber).

The wear amount of the rubber roller of each of the first through 16th examples measured after conducting the paper-feeding test was as small as 12–18 mg; that of the rubber roller of the first comparative example was 12 mg; and that of the rubber roller of each of the second through fourth comparative examples was as great as 25 mg–30 mg. That is, the rubber rollers of the second through fourth comparative example were inferior in wear resistance.

The rubber roller of each of the first through 16th examples got the good marks(⊙, ○, and Δ) in the test of visually inspecting blooming after the rubber rollers were left to expose them to the atmospheric air for one–six months, whereas the rubber roller of each of the first through fourth comparative examples got the bad mark (X) after they were left to expose them to the atmospheric air for one–three months. That is, the rubber roller of each of the first through fourth comparative example generated blooming to a high degree with age.

In the vulcanization of the material (rubber component) of the rubber composition composing the rubber roller of each of the first through 16th examples, the vulcanization speed of the rubber component and the start timing of the vulcanization thereof were almost equal to those of the material of the rubber composition of the first comparative example not containing the phenol resin. That is, the addition of the phenol resin, the halogenated phenol resin, and the metal halide to the rubber component did not inhibit the vulcanization speed and the start timing of the vulcanization.

As apparent from the foregoing description, according to the present invention, it is possible to obtain a rubber composition which contains EPDM rubber having a low degree of hardness and a high degree of wear resistance, because the EPDM rubber to which phenol resin, vulcanizing accelerator, and sulfur are added can be efficiently vulcanized, without generating blooming of the vulcanizing accelerator. Therefore, a rubber roller comprising the rubber composition molded into the shape of a roller has a high friction coefficient for a long time and a superior-paper-feeding performance.

What is claimed is:

1. A rubber composition comprising EPDM rubber contained therein as a main component thereof; wherein vulcanizing accelerator and 0.3–5.0 parts of weight of phenol resin per 100 parts by weight of said EPDM rubber are added to said EPDM rubber, and a mixture thereof is vulcanized with sulfur;

wherein the degree (n) of Polymerization of said phenol resin is 3–7.

2. The rubber composition according to claim 1, wherein said phenol resin is alkylphenol-formaldehyde resin.

3. The rubber composition according to claim 1, wherein said vulcanizing accelerator is used by mixing at least one of thiazole vulcanizing accelerator and sulfeneamide vulcanizing accelerator in combination with at least one of thiuram vulcanizing accelerator and dithiocarbamate vulcanizing accelerator.

4. The rubber composition according to claim 1, wherein said vulcanizing accelerator is 1–6 parts by weight of vulcanizing accelerator per 100 parts by weight of said EPDM rubber.

5. The rubber composition according to claim 1, wherein said vulcanizing accelerator is 3–5 parts by weight of vulcanizing accelerator per 100 parts by weight of said EPDM rubber.

* * * * *